US009980337B1

(12) United States Patent
Coombes et al.

(10) Patent No.: US 9,980,337 B1
(45) Date of Patent: May 22, 2018

(54) AUTOMATED LUMINAIRE LOCATION IDENTIFICATION AND GROUP ASSIGNMENT USING LIGHT BASED SECTORIZED COMMUNICATION FOR COMMISSIONING A LIGHTING CONTROL SYSTEM

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days. days.

(21) Appl. No.: 15/807,133

(22) Filed: Nov. 8, 2017

Related U.S. Application Data

(63) Continuation-in-part of application No. 15/643,244, filed on Jul. 6, 2017.

(60) Provisional application No. 62/492,849, filed on May 1, 2017, provisional application No. 62/511,254, filed on May 25, 2017.

(51) Int. Cl.
*H05B 33/08* (2006.01)
*H05B 37/02* (2006.01)

(52) U.S. Cl.
CPC ..... *H05B 33/0854* (2013.01); *H05B 37/0218* (2013.01); *H05B 37/0272* (2013.01)

(58) Field of Classification Search
None
See application file for complete search history.

(56) References Cited

U.S. PATENT DOCUMENTS

| | | |
|---|---|---|
| 2006/0049935 A1 | 3/2006 | Giannopoulos et al. |
| 2008/0218334 A1 | 9/2008 | Pitchers et al. |
| 2008/0309259 A1 | 12/2008 | Snijder et al. |
| 2011/0122796 A1 | 5/2011 | Simons et al. |
| 2012/0072138 A1 | 3/2012 | Walters et al. |
| 2013/0221858 A1 | 8/2013 | Silberstein |
| 2014/0086590 A1 | 3/2014 | Ganick et al. |
| 2014/0336821 A1 | 11/2014 | Blaine et al. |
| 2015/0130365 A1 | 5/2015 | Kim et al. |
| 2016/0366752 A1 | 12/2016 | Di Censo et al. |
| 2017/0094755 A1* | 3/2017 | Daranyi ............ H05B 37/0272 |
| 2017/0245352 A1 | 8/2017 | Van Der Brug |
| 2017/0286889 A1* | 10/2017 | Yu ................ G06Q 10/063114 |

FOREIGN PATENT DOCUMENTS

WO    WO-2012131631 A1    10/2012

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.

* cited by examiner

*Primary Examiner* — Dedei K Hammond
(74) *Attorney, Agent, or Firm* — Moyles IP, LLC

(57) ABSTRACT

Devices, systems, and methods are disclosed for automated luminaire location identification and grouping using sectorized visual light communication (VLC)/dark light communication (DLC). The VLC/DLC is used to identify, locate, and group luminaires in an environment for automatic commissioning and updating of lighting systems.

20 Claims, 16 Drawing Sheets

AUTOMATED LUMINAIRE LOCATION IDENTIFICATION AND GROUP ASSIGNMENT USING LIGHT BASED SECTORIZED COMMUNICATION FOR COMMISSIONING A LIGHTING CONTROL SYSTEM

CROSS REFERENCE TO RELATED APPLICATIONS

This application is a continuation-in-part of and claims priority to U.S. patent application Ser. No. 15/643,244 filed Jul. 6, 2017, which claims the benefit of U.S. Provisional Patent Application Ser. No. 62/492,849 filed May 1, 2017. This application claims the benefit of U.S. Provisional Patent Application No. 62/511,254 filed May 25, 2017. The disclosures of each application listed above are incorporated herein by reference in their entirety.

FIELD OF THE DISCLOSURE

Devices, systems, and methods for automated luminaire location identification using light is generally described. In particular, a system and a method for automatic luminaire location identification and group assignment using sectorized visual light communication (VLC)/dark light communication (DLC) for commissioning a lighting control are disclosed.

BACKGROUND OF THE DISCLOSURE

In lighting control systems with distributed or networked intelligent devices it is imperative that unique device network addresses are correctly identified and associated with their relevant locations/areas of control to facilitate correct operational configuration of the system. For example, one current identification method includes using a detachable printed identification (ID) number. An identification number and/or scan able code sticker is removed from the device upon installation and fixed to an installation drawing in its relevant location. This is then later referred to when commissioning/configuring the system.

Another system may use a barcode or other scan-able medium which is removed and affixed to a drawing for later scanning or scanned in-situ and used to directly update information within a commissioning application using software or a handheld tool.

Still further, if the identification of installed devices has not been previously recorded, it is then possible to identify networked devices by pressing a 'service pin' (physical button on the device) with a commissioning app/tool in a listening mode. The address of the device is then displayed or assigned to a pre-configured 'dummy'/virtual device.

A wink function may also be used to facilitate observational identification of luminaires particularly with networked Digital Addressable Lighting Interface (DALI)® addressed devices, which generally do not support the previous methods. The network is scanned for previously un-provisioned devices using a commissioning app/tool and then listed on a screen. A 'wink' option button for each of the results is provided and when selected causes the related luminaire to flash on and off repeatedly. When witnessed by the engineer, the device address can then be correctly assigned.

If during the physical installation of an intelligent lighting control system all information regarding addresses and locations has been accurately mapped and added directly to a commissioning application/tool or drawing, the issue of post-installation identification may not generally present a major problem, however from experience this is not always accurately carried out by electricians/installers and physical media such as installation drawings (with IDs attached) can be lost/damaged. Further, when changing devices, or replacing the gateway or the luminaire, the installer needs to follow a long manual procedure that is open to errors.

Visual light communication (VLC) is a known communication technique over Radio Frequency (RF) communication with certain benefits such as high bandwidth and immunity to interference from electromagnetic sources. VLC refers to an illumination source which in addition to illumination can send information using the same light signal. The revolution in the field of solid state lighting leads to the replacement of florescent lamps by Light Emitting Diodes (LEDs) which further motivates the usage of VLC.

VLCs are an emerging form of communication that use visual forms of light emitters to communicate data wirelessly. VLC uses a light source that is frequency modulated, or uses a light source that is turned on and off rapidly when transmitting a communication. VLC systems employ visible light for communication that occupy the spectrum from 380 nm to 750 nm corresponding to a frequency spectrum of 430 THz to 790 THz. The low bandwidth problem in RF communication is resolved in VLC because of the availability of the large bandwidth. The VLC receiver only receives signals if they reside in the same room as the transmitter, therefore the receivers outside the room of the VLC source will not be able to receive the signals and thus, it has the immunity to security issues that occur in the RF communication systems. As a visible light source can be used both for illumination and communication, therefore, it saves the extra power that is required in RF communication. Certain features of VLC include high bandwidth, no health hazard, low power consumption and non-licensed channels.

Some of the applications using VLC, among others, are: Light Fidelity (Li-Fi); vehicle-to-vehicle communication; underwater communication; hospitals; information displaying signboards; visible light identification (ID) system; Wireless Local Area Networks (WLANs); and, dimming systems. Implementation of VLC enabled LED luminaires, in addition to the infrared synchronization protocol, enabled inexpensive white LEDs to be time division multiplexed to avoid packet collisions. Luminaires use token message passing to regulate packet transmission.

Further, VLCs broadcast LED light fixture positioning signals using rapid modulation of light in a way that does not affect their primary functionality of providing illumination. The positioning signals are decoded by smartphone devices using their built-in front-facing camera (image) sensors and are used to compute the device's position in the venue. These positioning signals work like a beacon, which emits information to the environment. Distributed multi-hop visible light communication provides 3600 coverage for directionality, and a flexible design.

For example, for a lighting device to emit location information regarding its environment, the lighting device needs to know its own location. A VLC location inside a room with no GPS access may therefore be required as the GPS cannot be used for accuracy reasons and thus a lighting device does not know its own location. Further, the gateway that uses the VLC/DLC to communicate either knows the location or needs to learn the location.

Further, once the addresses of all luminaire control devices are known along with location information, the next process conducted will be to assign them to operational groups, representing areas such as rooms and corridors. This is ordinarily achieved by manually assigning known addressed devices to a group object so that all members can be controlled by a single command/message when later configured/programmed. As the size of a single lighting control network grows beyond that of a single zone of a floor, to the whole floor, the whole building and areas beyond, the time and labor expended on luminaire/networked device identification will likely be quite extensive. Some typical methods of device identification require some form of direct manual interaction and/or direct observation of the individual luminaire being identified.

Moreover, with the emergence of Internet of Things (IoT) based lighting control systems, the size of a single installation when compared to existing localized networked solutions will grow in size significantly due to the absence of limitations imposed by more localized technologies. As such, an automated method of luminaire location identification using light based communication/VLC/DLC has benefits for reducing the installation and commissioning time for a large lighting-based project.

In view of the above, adaptable and economic use of VLC/DLC in the luminaire industry is beneficial, particularly in Internet of Things (IoT) based lighting control systems. The present disclosure addresses these and other issues associated with VLC/DLC lighting control. For example, sectorized VLC/DLC identification of the exact location of a luminaire relative to a room and to other luminaires and grouping of luminaires based on light based sectorized VLC/DLC modulation technique. Further, automatic luminaire location identification using sectorized VLC/DLC for commissioning a lighting control in very large ecosystems such as a whole building or a floor, in quick turn-around time and reducing manual efforts.

BRIEF DESCRIPTION

This disclosure relates to a system for automated luminaire location identification using light. In particular, this disclosure relates to a system and a method for automatic luminaire location identification and group assignment using sectorized visual light communication (VLC)/dark light communication (DLC) for commissioning a lighting control. For purposes of this disclosure, "sectorized" means multifaceted or multi-surfaced especially with respect to a VLC/DLC receiver side wherein each facet or surface includes its own angle and orientation configured to measure a received intensity, direction, and/or identification of light. Further, this disclosure relates to grouping of luminaires based on sectorized VLC/DLC modulation for commissioning a lighting control system. According to one aspect, the system includes at least one of a plurality of luminaires and a plurality of LEDs, at least one sectorized VLC/DLC system, at least one sensor subsystem, at least one gateway, at least one network device, at least one cloud server, and at least one network gateway. The at least one sectorized VLC/DLC system includes at least one transmitter comprising at least one LED as light source and at least one receiver comprising of at least one photo detector or sensor, said sensor includes cameras, photodiodes and phototransistors, and LED's. The system may further include at least one dimming/VLC/DLC control protocol installed in a plurality of lighting devices and for controlling a plurality of dimming levels of the plurality of lighting devices, and at least one power meter. In an embodiment, the at least one gateway may be capable of discovering the at least one dimming/VLC/DLC control protocol installed in the plurality of lighting devices and controlling the dimming levels of the plurality of lighting devices. Further, the gateway may be capable of controlling the power to the luminaire and is capable of dimming the luminaire to 0 or shutting it off completely. The at least one of the plurality of luminaires and the plurality of LED's is physically connected to the at least one gateway via at least one dimming control interface. The at least one sectorized VLC/DLC system is physically or wirelessly/remotely connected to the at least one gateway on one side, and to the at least one plurality of luminaires and the plurality of LED's on other side. The at least one sensor subsystem senses and captures environmental data in real time. For purposes of this disclosure, "real time" refers to substantial concurrency and does not include any particular timeframe or limitation. An "environment" refers to a space or area in which a luminaire or lighting system is installed.

According to an aspect, the at least one sensor subsystem is connected with the at least one of the gateway along with the plurality of luminaires and the plurality of LED's. In an embodiment, the at least one power meter is connected with the at least one of the gateway along with the plurality of luminaires and the plurality of LED's. In an embodiment, the at least one cloud server is connected via at least one of a wired connection and a wireless connection, with the at least one gateway.

The at least one sensor subsystem senses and gather output from the luminaires during OFF and ON state and relays the information or data to the at least one gateway. The light patterns emitted by the luminaires during OFF and ON state are detected using light detection algorithm and stored in the at least one cloud server. The light patterns emitted by the luminaires during OFF and ON state are detected using the at least one sectorized VLC/DLC system on the at least one gateway. The transmitter of the at least one sectorized VLC/DLC system sends a code that is unique to the at least one gateway which is done by detecting one light at a time and all other light can detect it if they are close enough. The transmitter is configured to identify the amount of light intensity that each of the luminaire requires. The sectorized VLC/DLC receiver is a directional receiver which identifies the direction of the luminaire from which the information is received, said sectorized VLC/DLC receiver is geometrically shaped and includes multiple faces in 2D or semi 2D surface/multiple faces in 3D or semi 3D surface sensors. Based on the receiving pixels, the sectorized VLC/DLC receiver sensor identifies the direction of the luminaire from which the information is received. The sectorized VLC/DLC receiver sensors are located in specific direction. Each of the faces/surfaces has angle to that specific direction, and hence the amount of light received at the angle of the faces/surfaces is less than directly received, based on which the sectorized VLC/DLC receiver sensor gauges the direction.

The information or data is relayed to the gateway, which relays the information or data to the cloud server for storage and processing according to this disclosure. The included information in the message also helps luminaire devices to locate each other and the direction from which message is sent. The sectorized VLC/DLC transmitter can include in the directional sending or in the sectorized message the sector identification so to know the direction to which the transmitter is looking or facing. The distance is gauged and relative distance is gauged when the transmitter is using multiple dimming levels and includes the dimming level within the message. The sectorized VLC/DLC receiver uses the dimming level to gauge relative distance. The message also includes which other luminaire devices and relative dimming levels and directions were received by the transmitter prior to this message.

According to another aspect, the disclosure relates to a system and a method for automatic luminaire location identification and group assignment using sectorized VLC/DLC for commissioning a lighting control. Further, this disclosure relates to grouping of luminaires based on sectorized VLC/DLC modulation for commissioning a lighting control system. The objects are achieved by use of sensor subsystem with embedded light based sectorized communication/VLC/DLC. The system includes at least one of a plurality of luminaires and a plurality of LED's, at least one sensor subsystem with embedded sectorized VLC/DLC techniques, at least one gateway, at least one network device, at least one cloud server, and at least one network gateway. The system may further include at least one dimming/VLC/DLC control protocol installed in a plurality of lighting devices and for controlling a plurality of dimming levels of the plurality of lighting devices, and at least one power meter. In an embodiment, the at least one gateway may be capable of discovering the at least one dimming/VLC/DLC control protocol installed in the plurality of lighting devices and controlling the dimming levels of the plurality of lighting devices. Further, the gateway may be capable of controlling the power to the luminaire and is capable of dimming the luminaire to 0 or shutting it off completely. The at least one of the plurality of luminaires and the plurality of LED's is physically connected to the at least one gateway via at least one dimming control interface. The at least one sensor subsystem senses and capture environmental data in real time. According to an aspect, the at least one sensor subsystem is connected with the at least one of the gateway along with the plurality of luminaires and the plurality of LED's. In an embodiment, the at least one power meter is connected with the at least one of the gateway along with the plurality of luminaires and the plurality of LED's. In an embodiment, the at least one cloud server is connected via at least one of a wired connection and a wireless connection, with the at least one gateway.

The at least one sensor subsystem with embedded sectorized VLC/DLC techniques senses and gather output from the luminaires during OFF and ON state and relays the information or data to the at least one gateway. The light patterns emitted by the luminaires during OFF and ON state are detected using a light detection algorithm and stored in the at least one cloud server. Further sensor subsystem with embedded sectorized VLC/DLC techniques gather data or information to sense light intensity of the luminaire and/or relative power of a received wireless signal from the luminaire. According to an aspect, the sensor subsystem system may include one or more sectorized VLC/DLC sensors connected to the gateway. The sectorized VLC/DLC sensor is a directional receiver sensor which identifies the direction of the luminaire from which the information is received, said sectorized VLC/DLC receiver is geometrically shaped which may include multiple faces in 2D or semi 2D surface/multiple faces in 3D or semi 3D surface sensors. Based on the receiving pixels, the sectorized VLC/DLC receiver sensor identifies the direction of the luminaire from which the information is received, said sectorized VLC/DLC receiver sensors are located in specific direction. Each of the faces/surfaces has angle to that specific direction, and hence the amount of light received at the angle of the faces/surfaces is less than that directly received, based on which the sectorized VLC/DLC receiver sensor gauges the direction.

The information or data is relayed to the gateway, which relays the information or data to the cloud server for storage and processing according to this disclosure. The included information in the message also helps luminaire devices to locate each other and the direction from which message is sent. The sectorized VLC/DLC transmitter can include in the directional sending or in the sectored message the sector identification so to know the direction to which the transmitter is looking or facing in addition. The distance is gauged and relative distance is gauged when the transmitter is using multiple dimming levels and includes the dimming level within the message. The sectorized VLC/DLC receiver uses the dimming level to gauge relative distance. The message also includes which other luminaire devices and relative dimming levels and directions were received by the transmitter prior to this message.

In an embodiment, the sectorized VLC/DLC sensor is a ball shaped directional sensor which identifies the direction of the luminaire from which the information is received. In an embodiment, the sectorized VLC/DLC sensor is a cube shaped directional sensor which identifies the direction of the luminaire from which the information is received. In an embodiment, the sectorized VLC/DLC sensor is a triangular-based pyramid shaped directional sensor which identifies the direction of the luminaire from which the information is received. In an embodiment, the sectorized VLC/DLC sensor is a square-based pyramid shaped directional sensor which identifies the direction of the luminaire from which the information is received. In an embodiment, the sectorized VLC/DLC sensor is a dodecahedron shaped directional sensor which identifies the direction of the luminaire from which the information is received. In an embodiment, the sectorized VLC/DLC sensor is an icosahedron shaped directional sensor which identifies the direction of the luminaire from which the information is received.

In another aspect, the present disclosure is directed to a method for automatic luminaire location identification and group assignment using sectorized visual light communication (VLC)/dark light communication (DLC) for commissioning a lighting control. In an embodiment, the method may include providing at least one of a plurality of luminaires and a plurality of LED's, providing at least one sensor subsystem to capture environmental data in real time, providing at least one sectorized VLC/DLC system to gather data or information to sense light intensity of the luminaire, relative power of the received signal, and to identify the direction of the luminaire from which the information is received, creating a real map or floor plan using data acquired from the at least one sectorized VLC/DLC system, where all luminaire devices are located relative to the luminaire thus creating exact location identification without knowing the group. The luminaires are grouped based on the neighbors that communicate with the luminaire device. Based on the receiving pixels, the sectorized receiver sensor identifies the direction of the luminaire from which the information is received, said sectorized receiver sensors are located in specific direction. Each of the faces/surfaces has angle to that specific direction, and hence the amount of light received at the angle of the faces/surfaces is less than that directly received, based on which the sectorized receiver sensor gauge the direction.

In an embodiment, the method further includes receiving at least one real time sensing measurement from at least one sensor subsystem. According to an aspect, the at least one sensor subsystem is physically connected to the gateway, and the real time sensing measurement is received by the at least one gateway via at least one sensor interface. In an embodiment, the at least one power meter is physically connected to the at least one gateway. The method may further include transmitting at least one dimming control command based on the real time sensing measurement to generate a result, towards at least one of the plurality of luminaires and the plurality of LED's. The dimming/VLC/DLC control command may be transmitted by the at least one gateway via at least one dimming control interface during a protocol discovery process. According to an aspect, the method further includes measuring at least one generated result via the at least one sensor subsystem and/or the at least one power meter, discovering the at least one dimming/VLC/DLC control protocol installed in at least one of the plurality of luminaires and the plurality of LED's, and controlling a dimming level of at least one of the plurality of luminaires and the plurality of LED's. In an embodiment, the generated result is measured by the gateway, the dimming/VLC/DLC control protocol is discovered by the gateway, and the dimming level is controlled by the gateway.

Embodiments in accordance with the present disclosure enable automatic luminaire identification and group assignment capability using sectorized VLC/DLC for commissioning a lighting control. These and other advantages will be apparent from the embodiments described herein.

BRIEF DESCRIPTION OF THE FIGURES

The above and still further features and advantages of embodiments of the present disclosure will become apparent upon consideration of the following detailed description of embodiments thereof, especially when taken in conjunction with the accompanying drawings, wherein.

Figure 1:
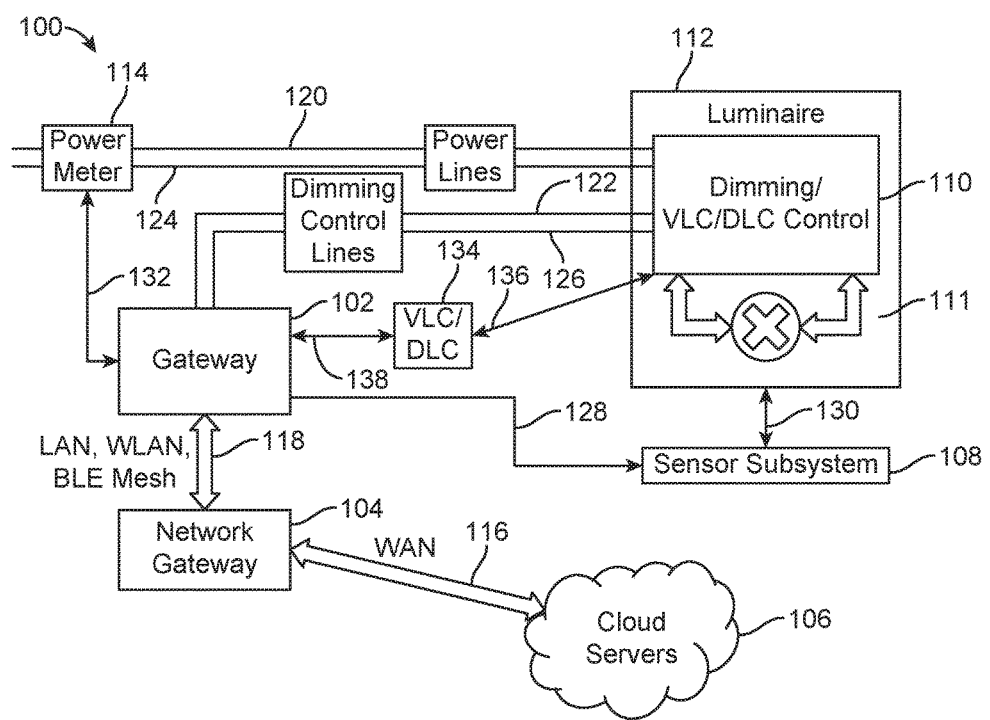
FIG. 1 is a high-level diagram of a system, according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used where possible, to designate like elements common to the figures.

DETAILED DESCRIPTION

Embodiments of the present disclosure relate generally to devices, systems, and methods for automated luminaire identification and group assignment. The systems and methods facilitate automatic luminaire identification (e.g., unique network addresses in smart lighting systems) and group assignment capability for commissioning a lighting control. Additionally, they provide dimming control, and facilitate ease of system integration associated with the vast size of required system, as well as ease of use and installation of such systems.

Embodiments of the present disclosure will be illustrated below in conjunction with the various figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magnetooptical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or other known databases consistent with this disclosure. Further, while reference is made to various types of databases, it will be understood by one of ordinary skill in the art that all of the database functions may be stored within compartments of a single database, or within individual databases. In any event, the disclosure is considered to include a tangible storage medium or distribution medium, and/or other devices and systems within the spirit and scope of this disclosure, in which the software implementations of the present disclosure are stored.

According to an aspect and with reference to FIG. 1, a system 100 for automatic luminaire location identification (unique addresses) and group assignment capability using sectorized VLC/DLC for commissioning a lighting control is described. The system 100 includes at least one of a plurality of luminaires 112 and a plurality of LED's 111, at least one sectorized VLC/DLC system 134, at least one sensor subsystem 108, a dimming/VLC/DLC control 110, at least one gateway 102, at least one cloud server 106, and at least one network gateway 108. In an embodiment, the luminaire 112 is a system that may include a single luminaire or multiple luminaires connected with a single common interface to power lines 120, 124 and dimming control lines 122, 126. In the exemplary embodiment shown in FIG. 1, the server is a cloud server 106. In the same or other embodiments, one or more severs 106 may be centralized servers, local servers, or other servers/system management devices according to particular needs. The luminaire 112 is connected to one or more sensors found in the at least one sensor subsystem 108. The sensors may be connected wirelessly or by wired connections to the at least one gateway 102 and/or to the servers 106 either directly or via gateway 102. Gateway 102 is configured to control illumination of, and communicate with, the luminaire 112. In the exemplary embodiment shown in FIG. 1, gateway 102 is a Universal Smart Lighting Gateway (USLG).

The sensor subsystem 108 may include at least one color sensor and at least one environment sensor. In an exemplary embodiment, the at least one color sensor is an up looking sensor that faces the luminaire(s) 112/LEDs 111 to directly measure at least one of an actual color content and light intensity of the luminaire(s) at the luminaire. The at least one environment sensor faces away or in a downward direction from the luminaire(s) 112 and senses aspects of the environment in which the luminaire(s) are installed. The at least one environment sensor comprises at least one of an ambient light sensor, orientation sensor, movement detection sensor, and a temperature sensor. According to an aspect, a power meter 114 may be connected electrically between the gateway 102 and the luminaire 112 and may be connected electrically to the luminaire 112 via the power lines 120, 124. The power meter 114 may be connected to the gateway 102 via the power meter interface 132.

As illustrated in FIG. 1, the sensor subsystem 108 connects via connection 130 to the luminaire, and via a sensor interface 128 to the at least one gateway 102. The at least one sensor subsystem 108 detects information related to the system 100 and the luminaires 112 by detecting current conditions of at least one of the luminaires 112. In the exemplary embodiment, the sensor subsystem 108 includes one or more environment sensors to sense and capture environmental data and human activities such as motion, direction, footfall (i.e., the number of people moving through a given space over a given period of time), ambient light level and temperature, operating temperature, humidity, etc. The sensor subsystem 108 of the exemplary embodiment also includes an up looking sensor such as a color sensor that faces a luminaire 112 directly and measures at least one of an actual color content and light intensity of the luminaire 112 at the luminaire 112. The gateway 102 communicates and controls the dimming level of the luminaire 112 and receives power consumption information from power meter 114. Thus, all of the noted operating aspects, among others, of the luminaires 112 can be known at any given time. The information or data from the power meter 114, sensor subsystem 108, and/or other system components is relayed either wirelessly or by wired connections to the gateway 102 and/or server 106 either directly or via the gateway 102. The information or data is ultimately provided to the cloud server 106 for storage and processing according to this disclosure. The sensor subsystem 108, power meter 114, and other components of the system 100 may collect and transmit this data in real time.

The at least one sectorized VLC/DLC system 134 is physically or wirelessly/remotely connected to the at least one gateway 102 via connection 138 on one side, and to the at least one plurality of luminaires 112 and the plurality of LED's 111 via connection 136 on other side. The at least one sectorized VLC/DLC system 134 includes at least one transmitter comprising at least one LED as light source and at least one receiver comprising of at least one photo detector or sensor, said sensor includes cameras, photo-diodes and phototransistors, and LEDs. The sectorized VLC/DLC receiver converts the analog light signal or data as received from the transmitter to digital values using three modules namely a light sensor to measure the intensity, an amplifier to strengthen the sensor output, and an analog-to-digital converter to obtain digital values or data. The sectorized VLC/DLC receiver detects information related to the luminaires 112 by detecting current conditions of at least one of the luminaires 112 such as light intensity received at the VLC/DLC sensor 134 from the luminaire 112 (and thereby a relative distance of the luminaire 112 from the VLC/DLC sensor 134 as described further below), relative power of a wireless signal received from the luminaire 112, and the direction of the luminaire 112 from which the light is received at the VLC/DLC sensor 134. At the sectorized VLC/DLC transmitter side, the information or data sensed is used to identify either the luminaire or the data alone sent using at least one of the sectorized VLC/DLC modulation techniques. In an aspect, the data or information or signal is mostly modulated using intensity. In an embodiment, the modulation techniques include On-Off-Keying (OOK), Pulse Time Modulation (PTM), Pulse Amplitude Modulation (PAM), Frequency Shift Keying (FSK), Phase Shift Keying (PSK), Orthogonal Frequency Division Multiplexing (OFDM), and Quadrature Amplitude Modulation (QAM). Further, at the sectorized VLC/DLC transmitter side, the information or data sensed is used to identify a relative distance of the luminaire 112 from the VLC/DLC receiver 134. A relatively low light intensity from the luminaire 112 (e.g., according to a range of light intensities from a plurality of luminaires 112 communicating with VLC/DLC sensor 134) may indicate that the luminaire 112 is relatively farther away from the VLC/DLC sensor 134 than other luminaires. On the other hand, a relatively high light intensity from the luminaire 112 may indicate that the luminaire 112 is at a shorter or closer distance to the VLC/DLC sensor 134.

The sectorized VLC/DLC receiver 134 is also a directional receiver which identifies the direction of the luminaire 112 from which light is received. The sectorized, directional receiver in the exemplary disclosed embodiments is geometrically shaped and may include multiple faces in 2D or semi 2D surface/multiple faces in 3D or semi 3D surface sensors. The receiver sensor includes pixels and, based on the pixels activated by light received from a luminaire 112, the sectorized receiver sensor identifies the direction of the luminaire 112 from which the information is received. The sectorized receiver sensors are located in a specific direction according to an angle of each sensor face/surface. Each of the faces/surfaces has angles to that specific direction, and hence the amount of light received at the angle of the faces/surfaces is less than directly received at the sensor, based on which the sectorized receiver sensor may gauge the direction of the luminaire.

In an aspect, the use of sectorized VLC/DLC system may turn on a luminaire device 112 that may modulate a specific information or data at a specific light intensity, wireless signal power level, and/or frequency. The information or data is received by a VLC/DLC sensor 134 and used to identify the luminaire device 112, gauge the relative distance to the luminaire device 112, and identify a direction of the luminaire 112 from which the information is received. The information or data is relayed either wirelessly or by wired connection to the gateway 102 and/or server 106 either directly or via gateway 102. The server 106 stores and processes the information according to this disclosure. The included information also helps luminaire devices locate each other based on, for example, the relative distances and directions between each luminaire and the VLC/DLC sensor 134 that received the information from each luminaire 112. The VLC/DLC transmitter can include in the directional sending or in the sectorized message to neighboring VLC/DLC sensor 134 receivers the sector identification so to provide the direction to which the transmitter is looking or facing.

According to another aspect of the exemplary disclosed embodiments, dimming levels of a luminaire 112 are used in the determination of a relative distance of the luminaire 112 from the VLC/DLC sensor 134. For example, when the transmitting luminaire 112 is transmitting at multiple dimming levels, the dimming level associated with a particular transmission is included as part of the transmission message information. The sectorized VLC/DLC receiver 134 uses the dimming level to gauge a relative distance of the transmitting luminaire 112. As will be explained further below, up looking sensors as part of sensor subsystem 108 measure directly the light intensity of the luminaire(s) 112 at any dimming level and may thereby normalize any differences detected between light intensities received at the VLC/DLC sensor 134 at different dimming levels.

According to additional aspects of the exemplary disclosed embodiments, the VLC/DLC transmitter message may also include information regarding other luminaire devices 112 and their respective relative distances and directions from the VLC/DLC receiver 134. All of this information may be forwarded to the server 106 which algorithmically determines a relative layout of neighboring luminaires 112 based on information from luminaires that communicate with a given VLC/DLC sensor (and associated luminaire) at, e.g., particular light intensities and frequencies. In the exemplary disclosed embodiments, the server may also place neighboring luminaires that communicate with the given luminaire 112/VLC/DLC sensor 134 at certain thresholds into groups.

In the exemplary embodiment shown in FIG. 1, the gateway 102 is configured to gather and communicate the sensors subsystem 108 output of the at least one of the plurality of luminaires 112 and the plurality of LED's 111 and sectorized VLC/DLC 134 output to the cloud server 106. In an aspect, the gateway 102 may be capable of detecting, communicating and handling/controlling a plurality of dimming protocols via the dimming/VLC/DLC control device 110, and to control the dimming/VLC/DLC control device 110 to provide a plurality of dimming levels to the luminaires 112. The output from the sensor subsystem 108 is to the cloud server 106 through the gateway 102 and network gateway 104 in the exemplary embodiment. The cloud server 106 may be configured to communicate information to a user device and/or interface (not shown) and provide updates and statuses of the luminaires 112 in each group/environment via associated gateways 102, sensor subsystems 108, etc. In addition, the gateway 102 may be configured to remotely receive control functions directly from the user device or via the cloud server 106 in various embodiments.

In another aspect of the exemplary disclosed embodiments, the cloud server 106 is configured to generate a real map or floor plan of luminaires 112 or lighting system components using data acquired from the at least one light sectorized communication/VLC/DLC system 134 and/or sensor subsystem 108, where all luminaire devices are located relative to the VLC/DLC system 134 and associated luminaire 112, thus creating location identification without knowing the group(s) to which all (or neighboring) luminaires belong. The data acquired from the at least one sectorized VLC/DLC system 134 and/or sensor subsystem 108 includes, among other things, relative distances and directions of each luminaire 112 from which light is received at the VLC/DLC sensor 134 and actual light intensity of each luminaire 112 at the luminaire (via up looking color sensor in the exemplary embodiments).

Figure 3:
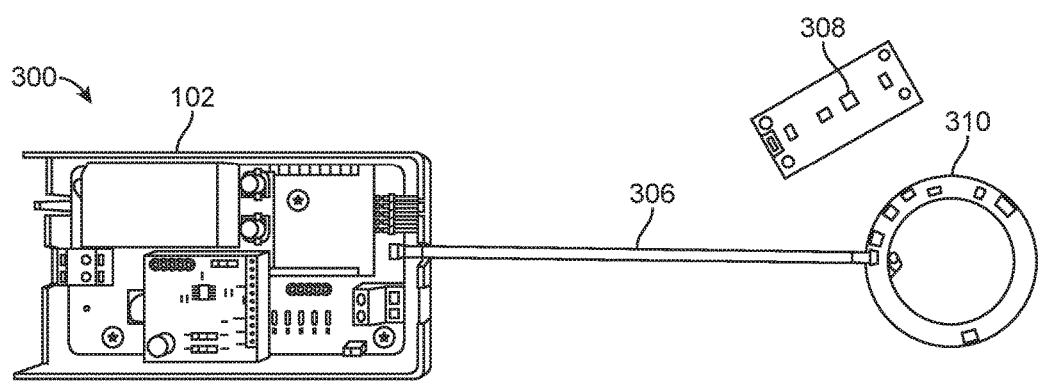
FIG. 3 is a perspective view of a system, illustrating a sensor connection to a luminaire, according to an aspect.

According to an aspect, the connection 130 to the luminaire 112 in the exemplary disclosed embodiments (such as shown in FIG. 3) is physical and is not limited to a specific location. In the same or other embodiments, one or more connections may be wireless. The location of the sensor subsystem 108 may be different for various types of sensors that are to be positioned. As seen in FIG. 3, for instance, physical sensor interfaces and connections may include the sensor interface 128 connected to the gateway 102. The gateway 102 is capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors. The connections can be as simple as analog interface connectors and/or electrical/digital bus connectors of any kind. The sensor interface 128 is tagged as "sensor interface". According to an aspect and with reference to FIG. 1, the system 100 further includes a backhaul interface 118 connected to the gateway 102 and the network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect, the gateway 102 is connected with the network gateway 104, which resides between the local networks to a Wide Area Network (WAN) 116. In an embodiment, the WAN 116 connects the gateway 102 to the cloud computers/ servers 106 for operational and management interfaces.

Figure 2:
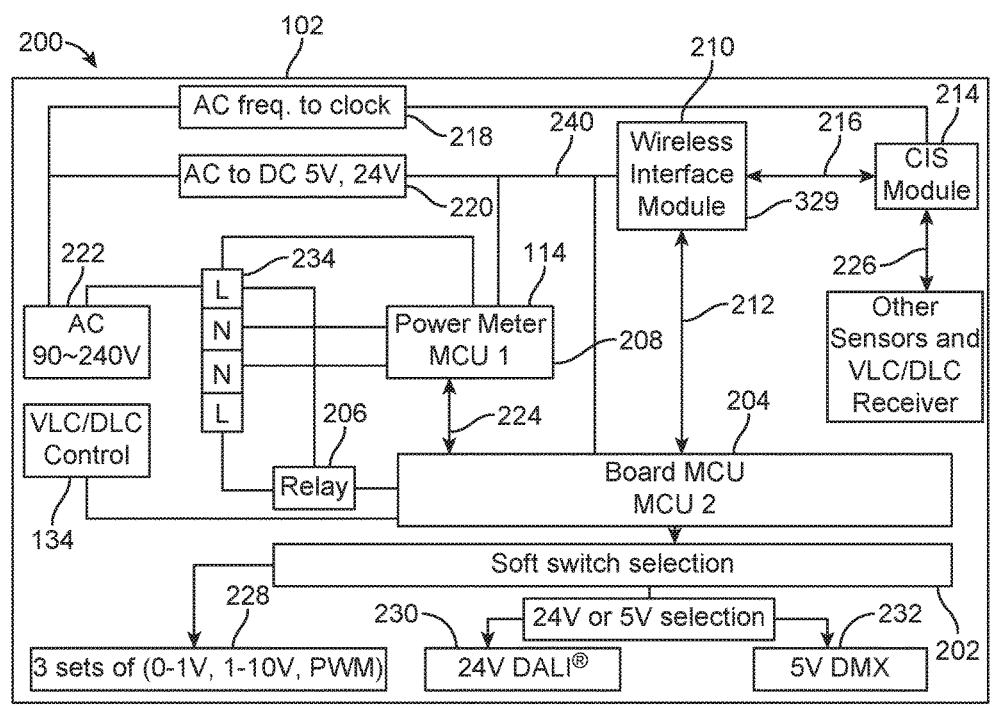
FIG. 2 is a gateway box diagram including a power meter connection, according to an embodiment.

FIG. 2 depicts the gateway 102 in further detail. According to an aspect, a soft switch 202 to select between different electrical dimming interfaces is provided. The soft switch 202 may be actively used to search for the correct protocol between the gateway 102 and the luminaire 112 (not shown in this figure). The luminaire 112 may be a dimming luminaire 112. According to an aspect, protocol modules 228, 230, and 232 are the software implementation of the dimming interfaces that reside in the gateway 102. In an embodiment, the supported dimming protocol include several sets of protocols, such as, for example, 0V-10V, 1V-10V, PWM 228, protocols over 0V-10V and/or 1V to 10V, a 24V DALI® 230 protocol, and a 5V DMX 232 protocol. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit 1 e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. According to an aspect, MCU-2 204 is also connected to a sectorized VLC/ DLC system 134, where the information is relayed to the MCU-2 204 In an embodiment, the MCU-2 204 also controls the Relay 206, which may be designed to cut off/block the current to the luminaire 112 upon a decision by the MCU-2 204. The power cutoff can be used to disconnect power from the controlled luminaire subsystem (for example, FIG. 1). In an embodiment, the WIM 210 is implemented as Bluetooth Low Power (BLE) device that uses the Mesh BLE protocol to connect with other devices, as well as having the SPI bus 212 and an Inter-Integrated Circuit Two-Wire Serial Interface bus (TWSI) 216. The WIM 210 is connected to the Camera Interface System (CIS) module 214, which may be, for instance, an environmental sensor and a Red, Green, Blue (RGB) sensor combination device. Other exemplary color sensors may be, for example, Yellow, Red, Green, Blue (YRGB) sensors or any other color sensors consistent with this disclosure. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2, and according to an aspect, provides the physical electrical line connections.

The power meter 114 connections are described in further detail, with reference to FIG. 2. The power meter 114 may be connected to an input line of the luminaire 112 (as shown in FIG. 1), in such a way that the power meter 114 measures electrical power drawn by the luminaire 112 at any given moment in real-time. According to an aspect, the power meter 114 is connected to the gateway 102 to provide real time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used. The power meter and connection may be any known power meter and/or connection within the spirit and scope of this disclosure.

Figure 1A:
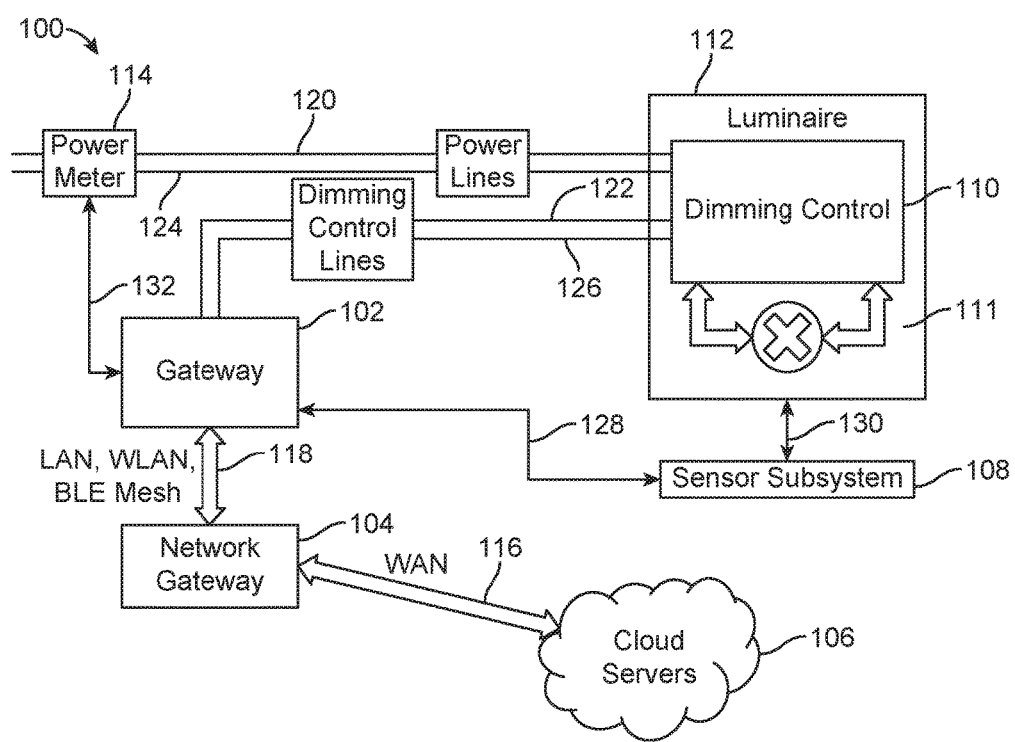
FIG. 1A is a high-level diagram of a system with sensor subsystem with embedded sectorized VLC/DLC, according to an embodiment.

According to another aspect and as shown in FIG. 1A, the exemplary embodiments include a system and a method for automatic luminaire location identification and group assignment using sectorized visual light communication (VLC)/dark light sectorized communication (DLC) sensor embedded in a sensor subsystem 108 for commissioning a lighting control. Further, this disclosure relates to grouping of luminaires based on sectorized VLC/DLC modulation for commissioning a lighting control system. The objects are achieved, for example, by use of a sensor subsystem 108 with an embedded sectorized VLC/DLC sensor. The system 100 includes at least one of a plurality of luminaires 112 and a plurality of LED's 111, at least one sensor subsystem 108 with embedded sectorized VLC/DLC functions, at least one gateway 102, at least one network device, at least one cloud server 106, and at least one network gateway 104. The system 100 may further include at least one dimming/VLC/ DLC control protocol 110 installed in a plurality of lighting devices and for controlling a plurality of dimming levels of the plurality of lighting devices, and at least one power meter 114. In an embodiment, the at least one gateway 102 may be capable of discovering the at least one dimming/ VLC/DLC control protocol installed in the plurality of lighting devices 112 and controlling the dimming levels of the plurality of lighting devices 112. Further, the gateway 102 may be capable of controlling the power to the luminaire 112 and is capable of dimming the luminaire 112 to 0 or shutting it off completely. The at least one of the plurality of luminaires 112 and the plurality of LED's 111 is physically connected to the at least one gateway 102 via at least one dimming control interface in the exemplary embodiment shown in FIG. 1A. In the same or other embodiments, one or more connections may be wireless.

With continuing reference to FIG. 1A, at least one environmental sensor of the sensor subsystem 108 faces away or in a downward direction from the luminaire(s) 112 measures in real time environmental data and human activities in an environment in which the luminaire 112 or lighting system is installed. An up looking sensor such as a color sensor of the sensor subsystem 108 faces the luminaire 112 directly and measures, for example and without limitation, an actual color content and light intensity of the luminaire 112 at the luminaire 112. According to an aspect, the sensor subsystem 108 connects via connection 130 to the luminaire and via a sensor interface 128 to the at least one gateway 102. In the exemplary embodiment shown in FIG. 1A, the at least one power meter 114 is connected with the at least one of the gateway 102 along with the plurality of luminaires 112 and the plurality of LED's 111. According to an aspect, power meter 114 may be connected electrically between the gateway 102 and the luminaire 112 and may be connected electrically to the luminaire 112 via the power lines 120, 124. The power meter 114 may be connected to the gateway 102 via the power meter interface 132. The at least one cloud server 106 is connected via at least one of a wired connection and a wireless connection with the at least one gateway 102.

The at least one sensor subsystem 108 with embedded sectorized VLC/DLC techniques senses and gather output from the luminaires 112 during OFF and ON state and relays the information or data either wirelessly or by wired connection to the at least one gateway 102 and/or server 106 either directly or via gateway 102. The light patterns emitted by the luminaires 112 during OFF and ON state are detected using light detection algorithms and stored in the at least one cloud server 106. Further, sensor subsystem 108 with embedded sectorized VLC/DLC techniques gather data or information to identify a relative distance and direction of a luminaire 112 from which light is received at the sensor subsystem 108. The information may include, among other things, a light intensity and/or wireless signal received from the luminaire 112 at the sensor subsystem 108. According to an aspect, the sensor subsystem system 108 may include one or more sectorized VLC/DLC sensors connected to the gateway 102. The sectorized VLC/DLC sensor is a directional receiver sensor, which identifies the direction of the luminaire from which the information is received. The exemplary sectorized VLC/DLC receiver is geometrically shaped and may include multiple faces in 2D or semi 2D surface/multiple faces in 3D or semi 3D surface sensors. Based on the receiving pixels, the sectorized VLC/DLC receiver sensor identifies the direction of the luminaire from which the information is received. For example, said sectorized VLC/DLC receiver sensors are located in specific directions according to their geometric shape. Each of the faces/surfaces has angle to that specific direction, and hence the amount of light received at the angle of the faces/surfaces is less than that directly received, based on which the sectorized VLC/DLC receiver sensor may gauge the direction of the received light.

The information or data from sensor subsystem 108 is relayed either wirelessly or by wired connection to the gateway 102 and/or server 106 either directly or via gateway 102. The information is also used to determine the location of luminaires relative to one another in the environment of the sensor subsystem 108 and/or associated luminaire 112. Other information that the sensor subsystem 108 may provide to the server 106 includes, for example and without limitation, the direction to which the embedded VLC/DLC transmitter is looking or facing and the dimming level(s) of transmitting luminaires 112. The direction to which the VLC/DLC transmitter is facing may be used as part of determining a direction of a transmitting luminaire 112. The sectorized VLC/DLC receiver may use the dimming level to compensate for differences in light intensity received at the VLC/DLC receiver as part of determining a relative distance of the transmitting luminaire 112. The information also includes a list of other light intensities, dimming levels, and directions of other luminaires from which light was received at the VLC/DLC receiver, which may be used to generate a map of luminaire locations relative to one another.

Figure 3A:
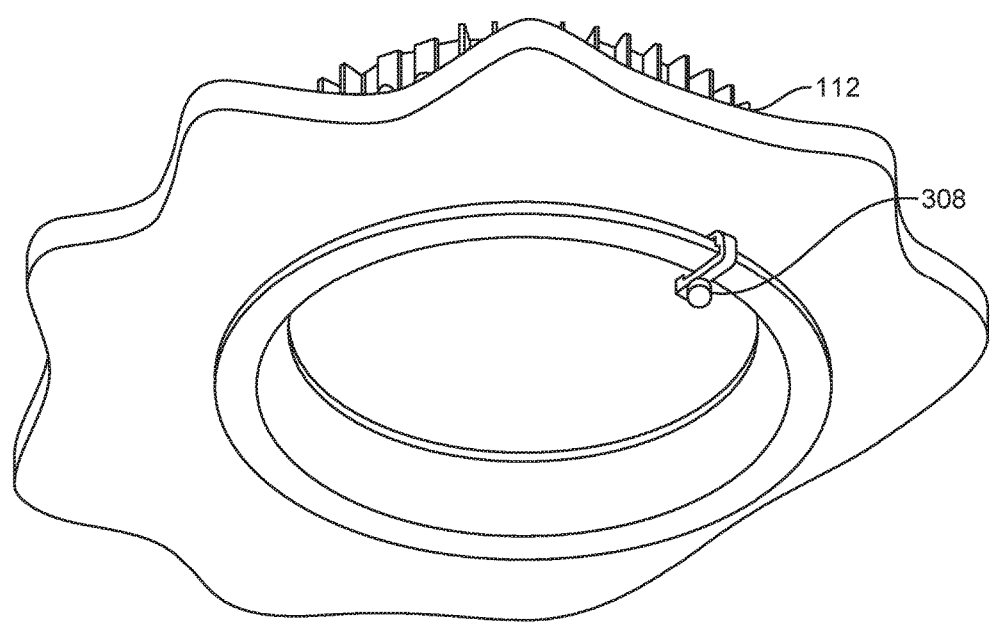
FIG. 3A is a perspective view of a ball shaped sensor connection to a luminaire, according to an aspect.
Figure 3B:
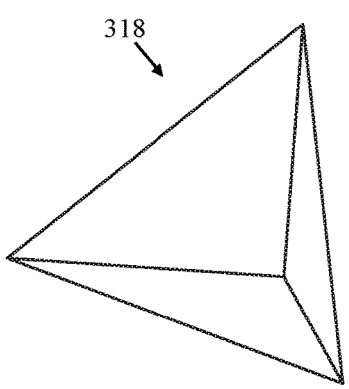
FIG. 3B is a perspective view of a triangular-based pyramid shaped directional sensor, according to an aspect.
Figure 3C:
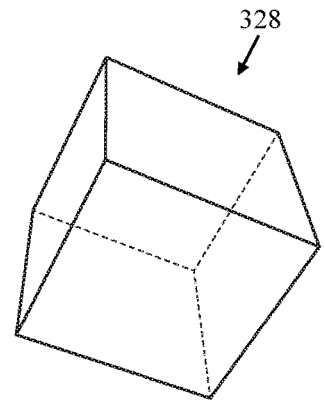
FIG. 3C is a perspective view of a cube shaped directional sensor, according to an aspect.
Figure 3D:
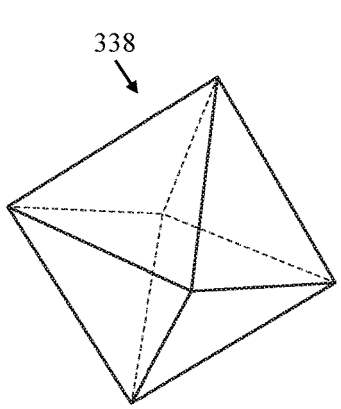
FIG. 3D is a perspective view of a square-based pyramid shaped directional sensor, according to an aspect.
Figure 3E:
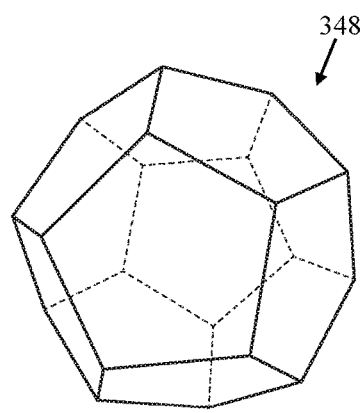
FIG. 3E is a perspective view of a dodecahedron shaped directional sensor, according to an aspect.
Figure 3F:
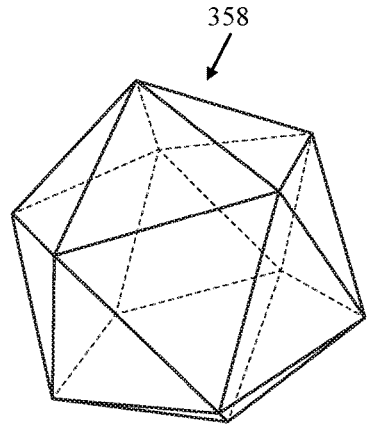
FIG. 3F is a perspective view of an icosahedron shaped directional sensor, according to an aspect.

As illustrated in FIG. 3A, the luminaire 112 is connected to a ball shaped sensor 308 to identify the direction of the luminaire using three-dimensionality, said sensor 308 is a VLC/DLC sensor/transceiver to identify the direction of the luminaire from which the information is received. FIGS. 3B-3F respectively show alternative, exemplary geometric embodiments of a sectorized VLC/DLC sensor including a triangular-based pyramid shaped directional sensor 318, a cube shaped directional sensor 328, a square-based pyramid shaped directional sensor 338, a dodecahedron shaped directional sensor 348, and an icosahedron shaped directional sensor 358.

According to an aspect, and as illustrated in FIGS. 4A, 4B, 4C, 4D and 4E, the system 300 may include one or more sectorized VLC/DLC sensors 318, 328, 338, 348, 358 typically configured as CIS modules 308, 310 (FIG. 3) connected to the gateway 102. The sectorized VLC/DLC sensor(s) are geometrically shaped and may include multiple faces in 2D or semi 2D surface/multiple faces in 3D or semi 3D surface sensors. Based on the pixels that receive light from a transmitting luminaire 112, the sectorized VLC/DLC sensor identifies the direction of the luminaire from which the light is received. The sectorized VLC/DLC sensor(s) are located in a specific direction. Each of the faces/surfaces has an angle to that specific direction, and hence the amount of light received at the angled faces/surfaces is less than that directly received at the sensor, based on which the sectorized receiver sensor gauges the direction of the transmitting luminaire.

Figure 4A:
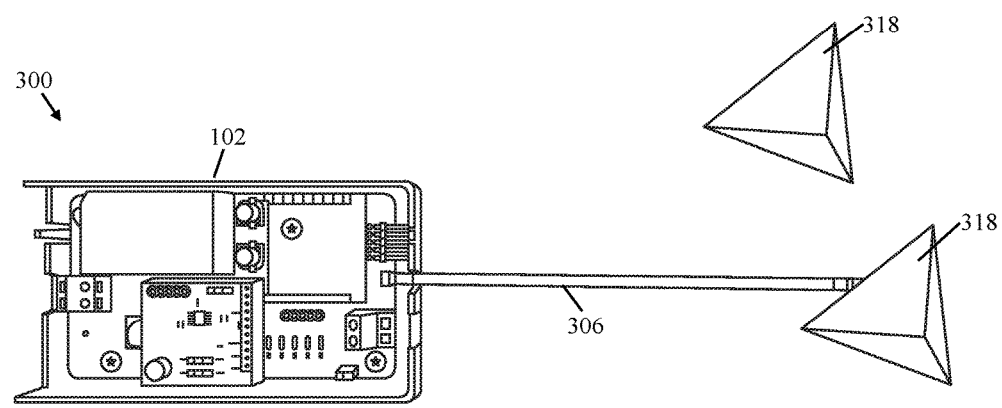
FIG. 4A is a perspective view of a system, illustrating a triangular-based pyramid shaped directional sensor connection to a luminaire, according to an aspect, according to an aspect.
Figure 4B:
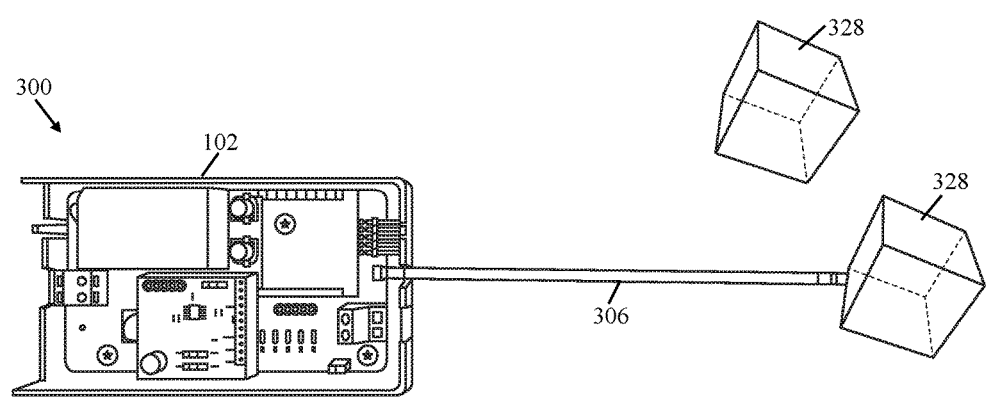
FIG. 4B is a perspective view of a system, illustrating a cube shaped directional sensor connection to a luminaire, according to an aspect.
Figure 4C:
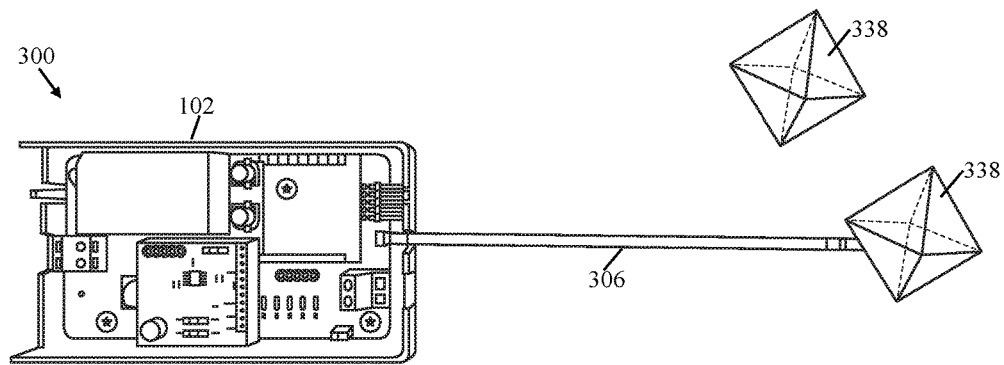
FIG. 4C is a perspective view of a system, illustrating a square-based pyramid shaped directional sensor connection to a luminaire, according to an aspect.
Figure 4D:
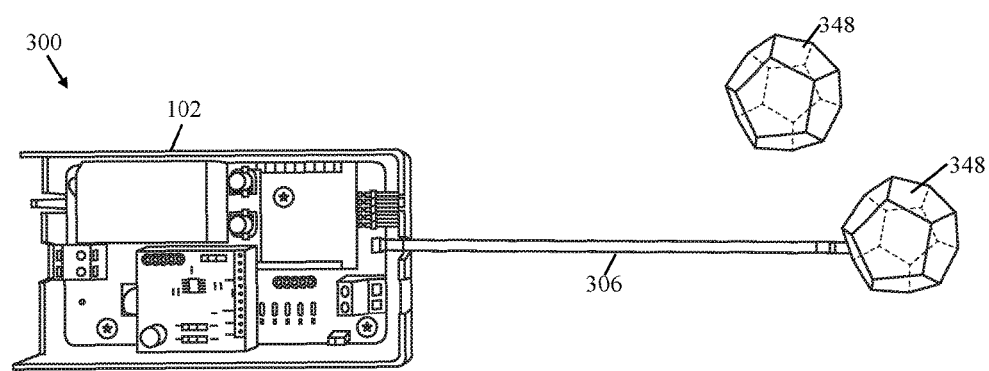
FIG. 4D is a perspective view of a system, illustrating a dodecahedron shaped directional sensor connection to a luminaire, according to an aspect.
Figure 4E:
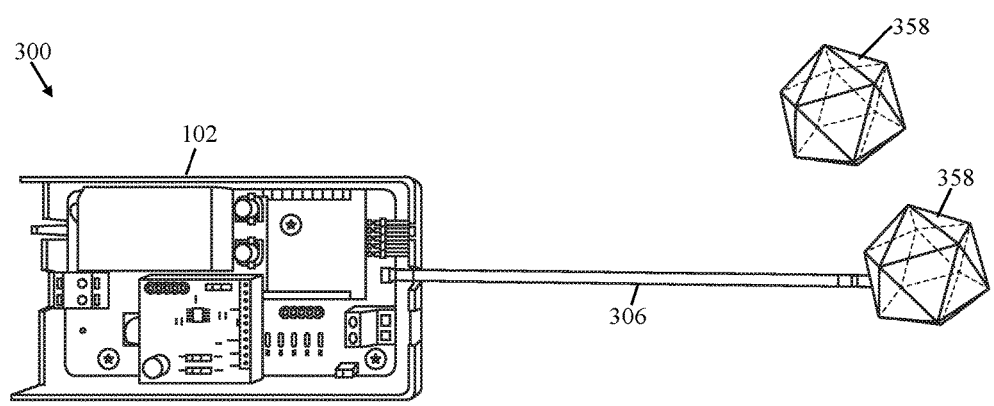
FIG. 4E is a perspective view of a system, illustrating an icosahedron shaped directional sensor connection to a luminaire, according to an aspect.

In an embodiment, the sectorized VLC/DLC sensor is a triangular-based pyramid shaped directional sensor 318, which identifies the direction of the luminaire 112 from which the information is received as illustrated in FIG. 4A. In an embodiment, and as shown in FIG. 4B the sectorized VLC/DLC sensor is a cube shaped directional sectorized sensor 328 which identifies the direction of the luminaire 112 from which the information is received. In an embodiment, and as shown in FIG. 4C the sectorized VLC/DLC sensor is a square-based pyramid shaped directional sensor 338 which identifies the direction of the luminaire 112 from which the information is received. In an embodiment, and as shown in FIG. 4D the sectorized VLC/DLC sensor is a dodecahedron shaped directional sectorized sensor 348 which identifies the direction of the luminaire 112 from which the information is received. In an embodiment, and as shown in FIG. 4E the sectorized VLC/DLC sensor is an icosahedron shaped directional sectorized sensor 358 which identifies the direction of the luminaire 112 from which the information is received. In other embodiments, the VLC/DLC sensor may take any configuration consistent with this disclosure.

Each of FIGS. 3, 4A, 4B, 4C, 4D and 4E illustrate an embodiment that includes at least one of a first CIS module 308 and a second CIS module 310 (FIG. 3) which are shown in FIGS. 4A-4E as or including sectorized VLC/DLC sensors 318, 328, 338, 348, 358. (Only one connection is actually depicted, although one or both of the sensors 308, 310 can be connected to the gateway 102 and may include any combination of sectorized VLC/DLC sensors.) According to an aspect, the exemplary CIS modules 308, 310 may include a physical interface 306 with the gateway 102 via a TWSI connection that uses a 6 or 8 pin FPC cable and connector. A wireless connection is also possible. The CIS modules 308, 310 may be physically connected at any desired position on the luminaire 112 (not shown). According to an aspect, the CIS module 308 is a linear module that can be adapted to fit on luminaires 112/devices that require a linear fitting. In an embodiment, the CIS module 310 is circular, and may be designed to fit circular-shaped luminaires 112.

In an embodiment, each of the CIS 308 and CIS 310 sensors include at least two sets of sensors (not shown). A first set of sensors (e.g., "environment sensors") may be dedicated to environment sensing, and may be arranged such that it faces away from and/or extends in a downwardly fashion, from the luminaire 112. According to an aspect, a second set of sensors or a single sensor (e.g., a "color sensor"/"RGB sensor") is arranged such that it faces the luminaire 112 directly. The first set is named the environment sensor and the second set is named the RGB sensor. The combination of the two sets of sensors, namely the environment sensor and the RGB sensor, may be combined into a single Application Specific Integrated Circuit (ASIC) or may be arranged as a set of separate devices. According to an aspect, the first and second set of sensors of the CIS 308 and CIS 310 modules may also connect with the gateway. Both sets of sensors may provide real time measurements and assessments to the gateway. In response to the measurements and assessments provided, the gateway may control the dimming device and change the dimming level and a color temperature and RGB/RGBW (Red Green Blue Warm White) color, in devices that allow for color temperature and RGB/RGBW color control.

According to an aspect, the system 100 includes the RGB sensor directly facing the luminaires 112 (not shown). The RGB sensor may measure both the RGB content of a light source and the light intensity of the light source. According to an aspect, the RGB sensor or combination of sensors is configured to measure multiple color channels as they directly face the luminaires 112. In an aspect, the RGB sensor may be a sectorized or non-sectorized sensor.

The environment sensor may be a low resolution imaging sensor, such as an array of sensors combined into a low resolution imaging device, or a single ASIC that is an imaging sensor. According to an aspect, the environment sensor measures environmental parameters and faces away from or in a downward direction from the luminaries. The environment sensor is arranged to monitor the environment in which the luminaire(s) are installed. According to an aspect, the environment sensor includes at least three different types of sensors, such as, a low-resolution image sensor, an ambient light sensor, and a temperature sensor. Without limitation, this disclosure refers to the three sensors included in the environment sensor collectively as an "environment sensor". In an embodiment, the environment sensor includes several environmental sensors. In other words, the environment sensor may include less or more sensors than described herein. Embodiments in accordance with the present disclosure can use other sensors and more types of sensors to sense the environment. According to an aspect, the environment sensor is a single sensor ASIC. To be sure, the environment sensor can be any sensor that is capable of collecting enough information to measure the environment, including ambient light and temperature.

According to an aspect, the combination of the environment sensor and the color sensor is set into one of a single ASIC or a set of separate devices connected to the gateway. The sensors may be directed as follows: the color sensor faces the luminaires, and the environment sensor faces away from the luminaires in such a way that it monitors the environment. Real time measurements and assessments may be conveyed to the gateway by the sensors that make up the sensor subsystem.

According to an aspect, the environment and color sensors of the sensor subsystem are placed/connected on a fitting of the luminaire. The exact location of the sensors is not fixed, e.g., two different luminaires by the same manufacturer of the same type of fitting and LED specifications may be assembled such that the sensor location is different relative to the surface and dimensions of the fitting. Thus, the location of the color and environment sensors on the fitting is not limited. The requirement of placing the color and environment sensors on the fitting at specific locations is not limited by this disclosure.

Figure 5:
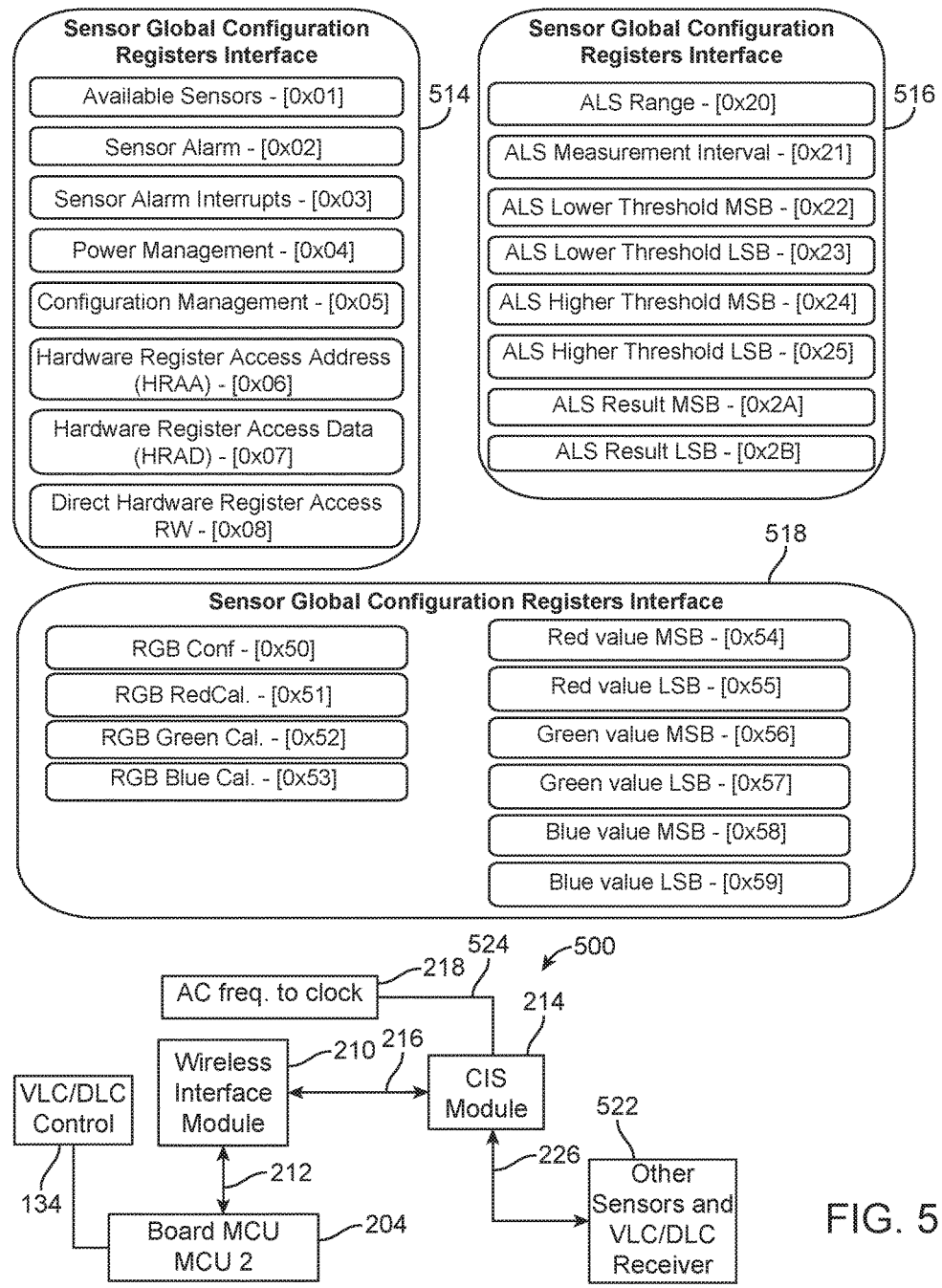
FIG. 5 is a diagram illustrating a type of information/data structure that is receivable by a sensor interface of a system, according to an embodiment.

FIG. 5 illustrates an embodiment of a sensor interface data structure 400. According to an aspect, the sensor interface is the TWSI 216 that allows the use of memory mapped registers to communicate information between the WIM 210 and the CIS module 214. In turn, the WIM 210 may provide this information and receive directives from the Board MCU-MCU 2 204 via a SPI bus 212. Any person of ordinary skill in the art will appreciate that the sensor module interface 212 can be very rich and may be distinct for each of the particular sensor devices 500 used in various configurations. As illustrated in FIG. 5, and according to an aspect, the sensor devices 500 may include multiple registers associated with any/all of its functions. FIG. 5 depicts some of the features to exemplify the data structure. In an embodiment, the interface 216, 226 with the sensor device is an array of eight bit (8-bit) registers (see, for instance, Sensor Global Configuration Register Interfaces 514 and 516). Each may be mapped to a specific memory address on the WIM 210. In an embodiment, a plurality of interfaces 514, 516, 518 is provided to control the sensors 500. In the exemplary embodiment of FIG. 5, an example of a register, such as a Sensor Global Configuration Register Interface 514 is illustrated. The Sensor Global Configuration Register Interface 514 may be set as follows: the register in address 0x01 will turn on bits associated with available sensors on the module. If a sensor does not exist, its bit may be set to 0. Available sensors in this embodiment may be: Ambient Light Sensor ("ALS"), Motion detection based on PIR ("PIR"), RGB sensor ("RGB"), Motion detection and direction based on frame capture ("MOT"), LED Lumen sensor ("LL"), and Temperature sensor ("TEMP"). According to an aspect, the register address 0x02 is used as an alarm for the different sensors; e.g., one can set the value range so that when reached by the specific sensor the appropriate alarm bit in this register will turn to 1, or else it is 0. The register in address 0x03 may be used for resetting sensor alarms when this occurs. According to an aspect, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. These are merely examples—additional sensors would expand (or constrict) the registers.

Figure 6:
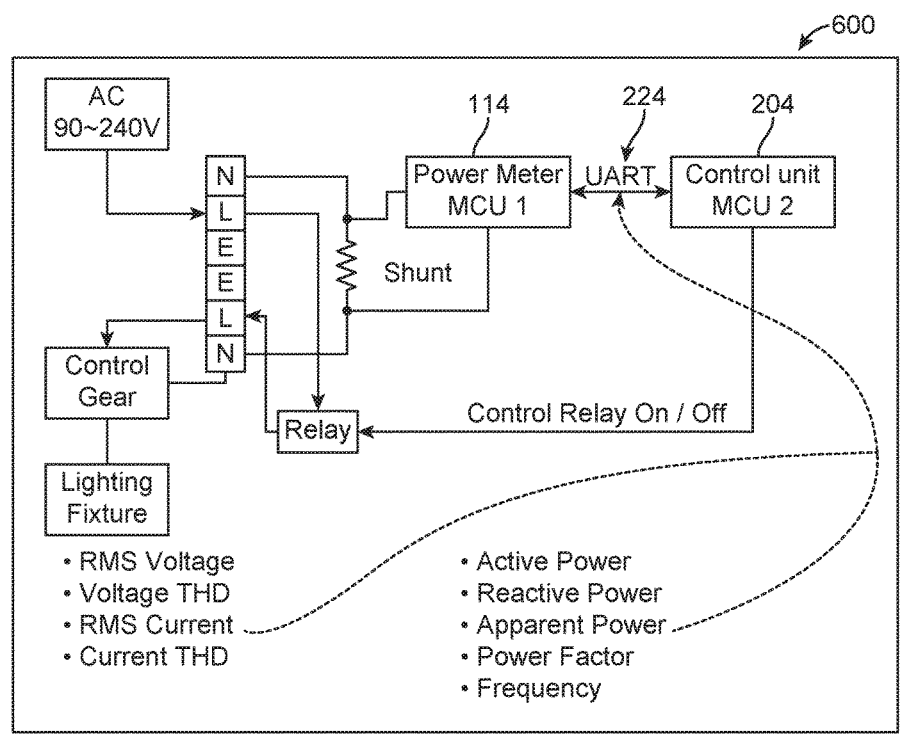
FIG. 6 is a diagram illustrating another type of information/data structure that is receivable over a power meter interface of a system, according to an embodiment.

FIG. 6 illustrates an embodiment 600 of the power meter 114, which may be used in the system 100. Any known power meter 114 device consistent with this disclosure may be used in the exemplary embodiment shown in FIG. 6. According to an aspect, the power meter 114 may be physically connected with and/or have physical connectivity within the USLG 102 (see, for example, FIG. 1). In one embodiment, the list of information that is communicated by the power meter 114 via the UART includes: RMS Voltage, Voltage THD, RMS current, Current THD, Active Power, Reactive power, Apparent power, Power factor, and Frequency. Various mixed signal microcontrollers 204, such as those sold by Texas Instruments under the Manufacturer's Code "MSP430I2041" may be used by the system 100 and are able to communicate with the power meter 114.

In general, aspects of the present disclosure describe a method for automatic luminaire location identification and group assignment using sectorized visual light communication (VLC)/dark light communication (DLC) for commissioning a lighting control. Further, this disclosure relates to grouping of luminaires based on sectorized VLC/DLC modulation for commissioning a lighting control system.

Exemplary embodiments in accordance with this disclosure provide an automated method of identifying exact luminaire location where all luminaire devices are located relative to a VLC/DLC sensor and/or associated luminaire, thus creating exact location identification of the luminaires without knowing the groups to which neighboring or other luminaires belong. The method may include the system providing at least one of a plurality of luminaires and a plurality of LED's, providing at least one sensor subsystem to sense and capture environmental data and color content/light intensity of the luminaires in real time, wherein the plurality of luminaires are connected to a plurality of sensors. In an embodiment, the plurality of sensors is simultaneously connected to at least one gateway, which is capable of gathering and communicating the sensed data of the plurality of luminaires. The method further consists of the forwarding, by the gateway, those received sensor output along with power readings of the plurality of luminaires over wired/wireless networks and via Wide Area Network ("WAN") to cloud servers for further processing. The output or data from the sensors is fed to the cloud server via the at least one gateway and network gateway. The cloud server uses the data from the sensors to automatically determine the location of luminaires within an environment. The cloud server may further communicate related information to a user device with a user interface to provide a user with updates and statuses of luminaires in the lighting system. The gateway may also remotely receive control function(s) from the user device, via the server and/or a backhaul interface, to actuate the luminaires with control parameters from remote location.

Figure 7:
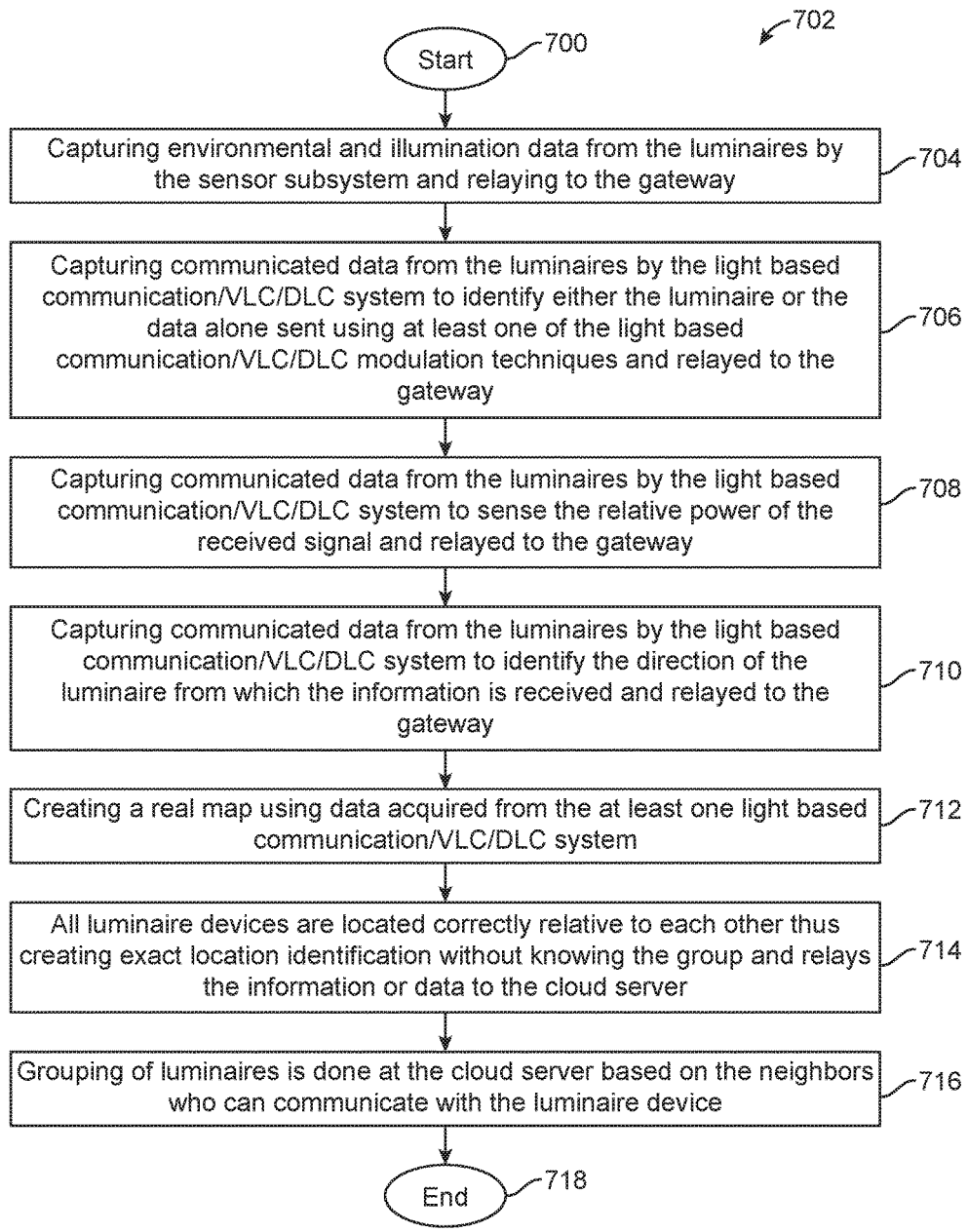
FIG. 7 is a flow chart illustrating automatic luminaire location identification and group assignment for commissioning a lighting control system according to an aspect.

FIG. 7 illustrates a flow chart of an aspect and a method 700 of a system 100. According to an aspect, system 100 is configured to perform various high-level system operations 702 via the server 106 (see FIG. 1), and in particular is configured to perform automatic luminaire location identification (unique addresses) for commissioning a lighting control system within an enclosed environment. The method includes at step 704, the at least one sensor subsystem 108 detects information related to the system and the luminaires by detecting current conditions of at least one of the luminaires. An environment sensor of sensor subsystem senses and captures environmental data and human activities such as motion, direction, footfall, ambient light level and temperature, operating temperature, humidity etc. An up looking color sensor of the sensor subsystem 108 measures at least an actual light intensity of each luminaire 112 at the luminaire. The dimming level and power consumption of each luminaire 112 is known respectively by an associated gateway 102 and power meter 114. Thus, the current operating conditions of the luminaires 112 are known and provided to the server 106. At step 706, at the sectorized VLC/DLC transmitter side, the information or light data sensed from each luminaire 112 is used to identify either the luminaire 112 or the data alone sent using at least one of the sectorized VLC/DLC modulation techniques. At step 708, at the sectorized VLC/DLC transmitter side, the information or light data sensed is used to determine a relative distance of each luminaire 112 from the VLC/DLC sensor 134. The light data is also used to determine a direction of the luminaire 112 from which the light was received at the VLC/DLC sensor 134. The information collected from the sensor subsystem 108, VLC/DLC sensor 134, and other system components may be used by the server 106 to generate a map of luminaire locations relative to each other.

The sectorized VLC/DLC transmitter can also provide the direction to which the transmitter is looking or facing, to use in determining the direction of the luminaire from which light is received. The dimming level for each luminaire may be used as part of determining the relative distance of the luminaire, for example by compensating for unexpected light intensity as a result of the dimming level. At step 710, sectorized VLC/DLC receiver identifies the direction of the luminaire from which the information is received, said sectorized VLC/DLC receiver is geometrically shaped and may include multiple faces in 2D or semi 2D surface/multiple faces in 3D or semi 3D surface sensors. Based on the receiving pixels, the sectorized VLC/DLC receiver sensor identifies the direction of the luminaire from which the information is received. The sectorized VLC/DLC receiver sensors are located in a specific direction. Each of the faces/surfaces has an angle to that specific direction, and hence the amount of light received at the angle of the faces/surfaces is less than that directly received, based on which the sectorized VLC/DLC receiver sensor may gauge the direction of the luminaire 112 from which the light was received.

Accordingly, modulated light information from the luminaire 112 is used to identify the luminaire, light intensity received at the VLC/DLC sensor 134 from the luminaire (at the dimming level of the luminaire) is used to determine a relative distance of the luminaire from the VLC/DLC sensor 134, and the orientation of light received by the VLC/DLC sensor 134 is used to determine the direction of the luminaire from which the light is received. This information is provided to the server 106 for all luminaires 112 in an environment and/or capable of communicating with each other. At step 712, a real map or floor plan is created using data acquired from the at least one sectorized VLC/DLC system. At step 714, all luminaire devices are located relative to each VLC/DLC system and associated luminaire(s) thus creating exact location identification for each luminaire without knowing a group of luminaires in which a particular luminaire is located. At step 716, processing is done at the cloud server 106 based on the information or data for grouping the identified luminaires based on the neighbors who can communicate with the luminaire device. The luminaires may then be assigned a unique address or identification based on their assigned group, location on the map, etc.

Figure 8:
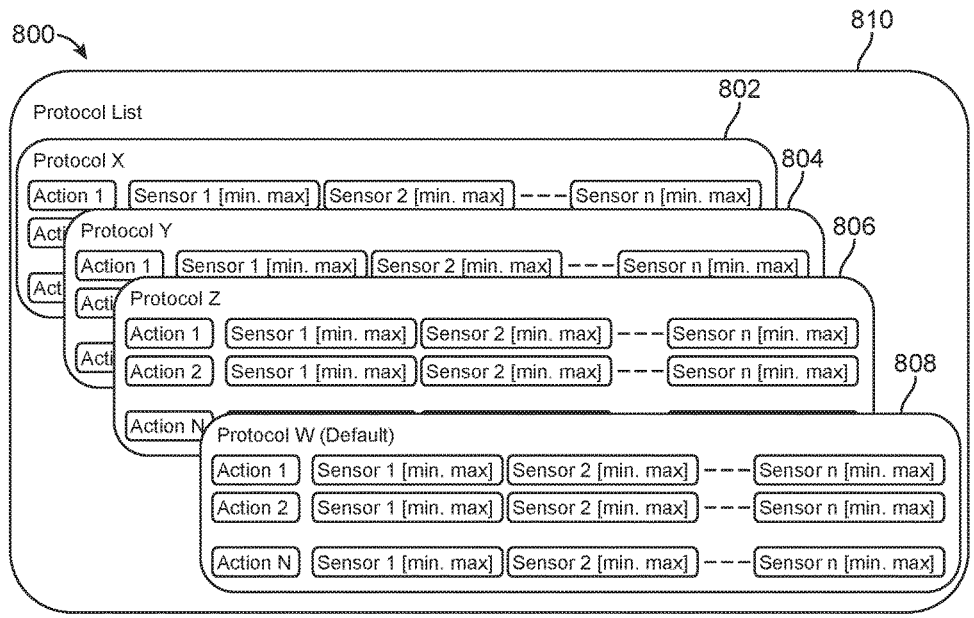
FIG. 8 is a diagram illustrating a list of protocols and their related actions and expected value range for sensor measurements of a system, according to an embodiment; and, FIG. 9 is a flow chart illustrating a protocol discovery process of a system including a discovery algorithm, according to an embodiment.

FIG. 8 illustrates an embodiment 800 of a protocol list data structure 810 for the gateway 102. The data structure 810 may be designed such that it is easy to traverse the protocol options and pick the correct protocol during the discovery process. The protocol list includes N protocols, were N can be any number. In an embodiment, each protocol (X 802, Y 804, Z 806 . . . W 808) contains directives to the gateway 102 to setup the specific protocol interface (e.g., power level, specific line connections, and other required information as dictated by the protocol standard interface). Further, each protocol may contain a set of directives/actions numbered 1-N. The discovery process may use these directives to take actions like sending a message or changing the voltage level over the dimming control lines. According to an aspect, each action in the list is associated with a list of sensor measurement ranges, one per sensor and per power meter. These measurement ranges may be compared with actual readings as part of the dimming protocol discovery process. In an embodiment, at least one of the protocols, without limitation, can be marked as a default protocol W 808. According to an aspect, this is the protocol to which the gateway 102 will default into when no other protocol is discovered.

Figure 9:
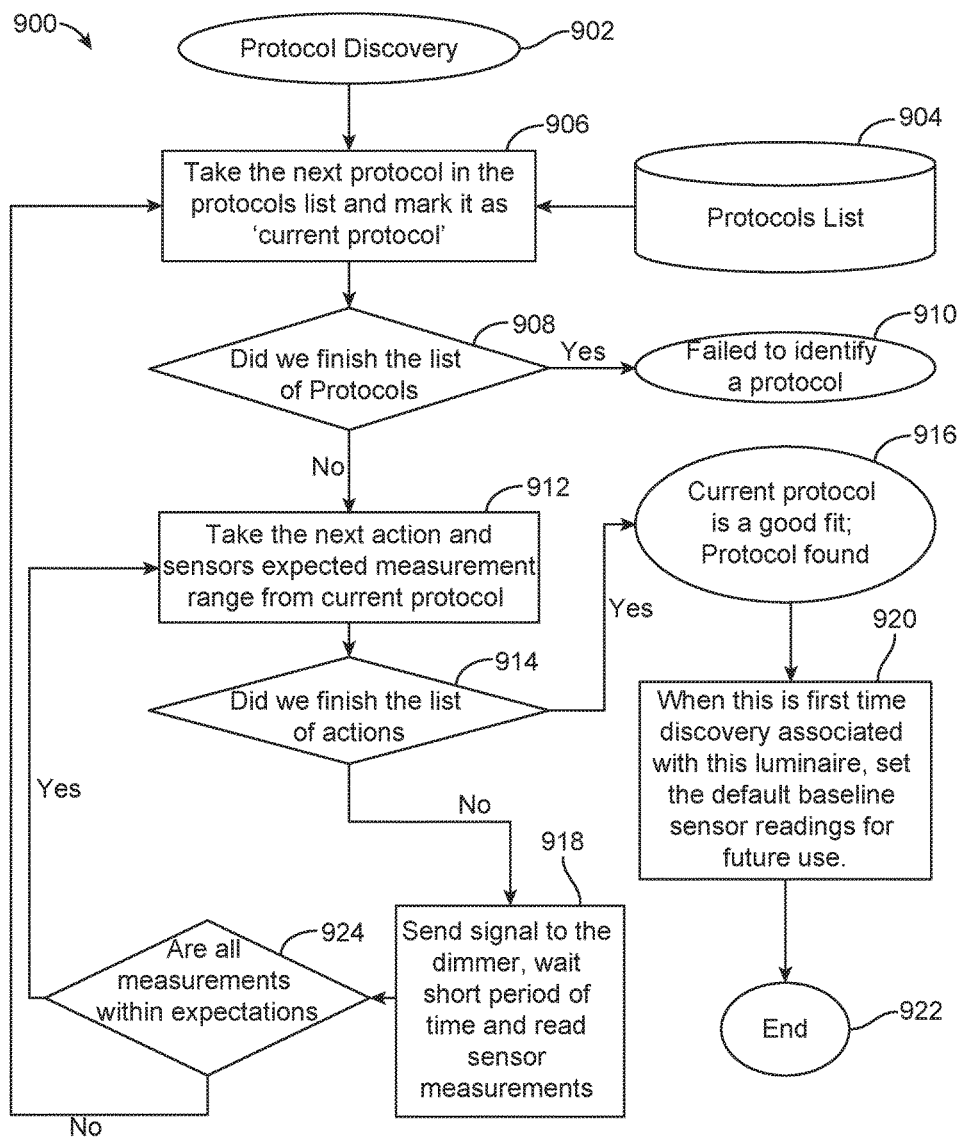

FIG. 9 illustrates an embodiment 900 of the protocol discovery process 902. According to an aspect, at step 904, the protocol is determined from a list of protocols, as seen, for instance, in FIG. 8. At step 906, the process may include retrieving/taking/assuming a protocol from the list of protocols, and mark it as the "current protocol". The current protocol may include a dimming control protocol. At step 908, the system may check if the entire list of protocols is finished. If the list is completed 'Yes', then the next step of operation goes to step 910, which may indicate that there has been a failure to identify a protocol. In an embodiment, when a current protocol that has passed all of the verifications correctly is found, proper identification of the protocol and/or the identification process will be successfully achieved. If the list is not finished, 'No', then the next step of operation may go to step 912. According to an aspect, at step 912, the system activates the next action inside the protocol, and takes measurements via the sensors, based on a previously identified range. In other words, at step 912, the system expects the measurements to be in specific ranges using the current protocol. In an embodiment, the method further includes receiving at least one real time sensing measurement from at least one sensor subsystem. The gateway 102 may utilize the at least one real time sensing measurement to correlate between the at least one dimming control protocol and between the plurality of luminaires. The sensor subsystem may be configured substantially as described hereinabove and illustrated in FIG. 3, and may include at least one of a color sensor and an environmental sensor. Each of the sensor subsystem and the power meter may be physically connected to the at least one gateway 102, and the real time sensing measurement may be received by the at least one gateway 102 via at least one sensor interface. According to an aspect, the gateway 102 may be connected to the at least one power meter via a Universal Asynchronous Receiver/Transmitter interface. According to an aspect, the gateway 102 may also be connected to at least one network gateway 104 in a backhaul interface 118 via at least one of a LAN, a WLAN, a WAN, and a Mesh BLE radio network. In an embodiment, at least one network gateway 104 is connected to at least one cloud server 106 via the WAN.

At step 914, the system may check whether the entire list of actions has been finished/completed. If the actions are finished, 'Yes', then the next step of operation is step 916, which may include determining that the current protocol is a good choice/fit for the system, and the protocol may be finalized. According to an aspect, at step 920, after the protocol is found, the system saves the default baseline sensor readings for future use. In an embodiment, at step 922 the process ends. According to an aspect, if the actions are not finished in step 914, 'No', then the next step of operation may be step 918 where the system sends signals to the dimmer, waits a short period of time and reads sensor measurements.

In an embodiment, step 924 may follow step 918. According to an aspect, at step 924, the measurement, such as, for example, the real time sensing measurement, is taken to see if they are within expectations. If 'Yes', measurement is within expectations then the system moves back to step 912 to select the next action in the protocol verification process. If 'No', such as, for instance, measurement is outside the normal range, the system may move back to step 906, where it will pick a new protocol to check. The steps in the process may include the following: The protocol list at step 906 includes a pointer to the 'next protocol' and marks it as current protocol at step 904 in use with this device. If no protocol is the 'next protocol', the pointer may be pointing to an empty protocol indicating that the beginning of the list is next. The algorithm's first step is to advance the last protocol pointer to the next protocol in the list. If there are no protocols, e.g., after advancing through the end with an empty protocol, then there are no more protocols to check and the algorithm chooses the default protocol in the list, or simply exits with failure. In case the protocols list is not exhausted, there is a valid 'current protocol' to verify. The gateway sets up the dimming control lines to match the requirements of the 'current protocol'.

For every action in the 'current protocol', the gateway may take this action, wait a given amount of time associated with this action within the 'current protocol' action record information, and then reads current sensor measurements. If any of the measurements are outside the correlated range indicated by the sensor records list associated with this 'current protocol' and action, the gateway may move to the next protocol and start from the beginning to verify this new protocol. In cases where the sensor measurements meet the expected measurements indicated in the sensors list data range, the gateway may proceed to the next action in the list of 'current protocol'. In cases when there are no more actions to measure within the 'current protocol', the gateway may choose this 'current protocol' as the correct protocol for this device.

Protocol discovery can happen for multiple reasons. For example, when protocol discovery is initiated due to change in luminaire or when a new luminaire is being connected, the discovery protocol may add a step in which the base sensor parameters are updated to reflect the characteristics of the new luminaire. According to an aspect, this action helps set expected values and tune dimming parameters to sensor readings, such that appropriate correlation can be achieved. The gateway may keep historical correlated values for its sensor to enable correlation that is time dependent. For example, LED-based luminaire lumen values and the sensor readings may be impacted by the lumen state of the LED, and the lumen state and readings of the LED may deteriorate over time. According to an aspect, retaining/keeping historical or accumulated information may allow the gateway system to identify change in readings over time and to adjust the dimming directives to reflect the requested dimming level correctly. According to an aspect, the at least one gateway may distinguish between a digital protocol and at least one analog protocol. In an embodiment, the digital protocol includes one of DALI® and DMX, and the analog protocol includes one of 0V-10V and 1V-10V.

The components of the system illustrated are not limited to the specific embodiments described herein, but rather, features illustrated or described as part of one embodiment can be used on or in conjunction with other embodiments to yield yet a further embodiment. It is intended that the system include such modifications and variations. Further, steps described in the method may be utilized independently and separately from other steps described herein.

The system and method have been described above, with reference to specific embodiments; various changes may be made and equivalents may be substituted for elements thereof without departing from the scope contemplated. In addition, many modifications may be made to adapt a particular situation or material to the teachings found herein without departing from the essential scope thereof.

The present disclosure, in various embodiments, configurations and aspects, includes components, methods, processes, systems and/or apparatus substantially depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects, for the purpose of streamlining the disclosure. The features of the embodiments, configurations, or aspects of the present disclosure, may be combined in alternate embodiments, configurations, or aspects other than those discussed above. This method of disclosure is not to be interpreted as reflecting an intention that the present disclosure requires more features than are expressly recited in each claim. Rather, as the following claims reflect, exemplary aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art after understanding the present disclosure. Furthermore, the disclosure includes alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatic luminaire location identification and group assignment, comprising:
   a sectorized visual light communication (VLC)/dark light communication (DLC) sensor having at least one angled face or surface and configured to capture light data from at least one luminaire and transmit the light data to a first gateway;
   a sensor subsystem configured to measure at least an actual light intensity of the luminaire at the luminaire; and,
   a server in data communication with the first gateway and sensor subsystem,
   wherein the light data includes at least an identification of the luminaire and an intensity of the light and direction of the luminaire from which the light is received at the sectorized VLC/DLC sensor, the light data regarding the direction of the luminaire is based at least in part on the intensity of light received at the angled face or surface of the sectorized VLC/DLC sensor, the first gateway is configured to transmit the light data to the server, the sensor subsystem is configured to transmit the actual light intensity of the luminaire to the server either directly or via the first gateway or a second gateway, and the server is configured to generate a map of luminaire locations based on the light data and actual light intensity for each luminaire.

2. The system of claim 1, wherein the server is further configured to calculate a distance from the sectorized VLC/DLC sensor to each luminaire from which light is received at the sectorized VLC/DLC sensor based at least in part on a comparison of the light intensity received at the sectorized VLC/DLC sensor and the actual light intensity for each luminaire.

3. The system of claim 2, wherein the server is further configured to calculate a distance from the sectorized VLC/DLC sensor to each luminaire from which light is received at the sectorized VLC/DLC sensor based at least in part on a dimming level for each luminaire.

4. The system of claim 2, wherein the server is further configured to assign each luminaire from which light is received at the sectorized VLC/DLC sensor to a group of luminaires based at least in part on the distance of each luminaire from the sectorized VLC/DLC sensor.

5. The system of claim 4, wherein the server is further configured to assign each luminaire from which light is received at the sectorized VLC/DLC sensor to a group of luminaires that communicates with a luminaire associated with the sectorized VLC/DLC sensor.

6. The system of claim 1, wherein the sectorized VLC/DLC receiver is a directional receiver sensor with multiple faces in at least one of 2D and semi 2D surface and 3D and semi 3D surface.

7. The system of claim 5, wherein the sectorized VLC/DLC receiver is one of a ball shaped directional sensor, a cube shaped directional sensor, a triangular-based pyramid shaped directional sensor, a square-based pyramid shaped directional sensor, a dodecahedron shaped directional sensor, or an icosahedron shaped directional sensor.

8. The system of claim 1, wherein the sensor subsystem includes at least one environment sensor and one color sensor.

9. The system of claim 8, wherein the environment sensor includes at least one of a low-resolution image sensor, ambient light sensor, orientation sensor, movement detection sensor, and temperature sensor.

10. The system of claim 8, wherein the color sensor is an up looking sensor that faces the luminaire directly to measure the actual light intensity of the luminaire.

11. The system of claim 1, wherein the server is a cloud server.

12. A method of automatic luminaire location identification and group assignment, comprising:
turning on at least one luminaire via a gateway;
capturing light data from the luminaire at a sectorized visual light communication (VLC)/dark light communication (DLC) sensor having at least one angled surface or face, wherein the light data includes a direction of the luminaire from which the light is received based at least in part on the light intensity received at the angled surface or face of the VLC/DLC sensor;
measuring with an up looking sensor an actual light intensity of the luminaire at the luminaire;
transmitting the light data and actual light intensity to a server either directly or via the first gateway or a second gateway;
identifying the luminaire based at least in part on the light data from the luminaire; and,
creating with the server a map of luminaire locations based at least in part on the light data and actual light intensity.

13. The method of claim 12, further comprising calculating with the server a distance from the sectorized VLC/DLC sensor to each luminaire from which light is received at the sectorized VLC/DLC sensor based at least in part on a comparison of the light intensity received at the VLC/DLC sensor and the actual light intensity for each luminaire.

14. The method of claim 13, further comprising calculating with the server a distance from the sectorized VLC/DLC sensor to each luminaire from which light is received at the sectorized VLC/DLC sensor based at least in part on a dimming level for each luminaire.

15. The method of claim 12, further comprising assigning with the server each luminaire from which light is received at the sectorized VLC/DLC sensor to a group of luminaires that communicates with a luminaire associated with the sectorized VLC/DLC sensor.

16. The method of claim 12, wherein the sectorized VLC/DLC sensor is a directional sensor with multiple faces in at least one of a 2D surface or a semi 2D surface, and a 3D surface or a semi 3D surface.

17. The method of claim 16, wherein the sectorized VLC/DLC sensor is one of a ball shaped directional sensor, a cube shaped directional sensor, a triangular-based pyramid shaped directional sensor, a square-based pyramid shaped directional sensor, a dodecahedron shaped directional sensor, or an icosahedron shaped directional sensor.

18. The method of claim 12, further comprising assigning an exact location address to each luminaire in the map of luminaire locations.

19. A system for automatic luminaire location identification and group assignment, comprising:
a sectorized visual light communication (VLC)/dark light communication (DLC) sensor having at least one angled surface or face and configured to detect light data to identify a luminaire and measure a light intensity and a direction of the luminaire from which the light is received at the sectorized VLC/DLC sensor; and,
an up looking sensor configured to face the at least one luminaire directly and determine an actual light intensity of the luminaire at the luminaire,
wherein the direction of the luminaire from which the light is received at the sectorized VLC/DLC sensor is based at least in part on the light intensity received at the angled surface or face of the sectorized VLC/DLC sensor.

20. The system of claim 19, further comprising a server configured to generate a map of luminaire locations based at least in part on the light intensity and direction of the luminaire from which the light is received at the sectorized VLC/DLC sensor and the actual light intensity of the luminaire at the luminaire.

* * * * *

UNITED STATES PATENT AND TRADEMARK OFFICE
CERTIFICATE OF CORRECTION

PATENT NO. : 9,980,337 B1
APPLICATION NO. : 15/807133
DATED : May 22, 2018
INVENTOR(S) : Simon Coombes and Shmuel Silverman Page 1 of 1

It is certified that error appears in the above-identified patent and that said Letters Patent is hereby corrected as shown below:

In the Specification

Column 9, Line 29, the portion of the text reading "gateway 108" should read "gateway 102"

Signed and Sealed this
Ninth Day of October, 2018

Andrei Iancu
*Director of the United States Patent and Trademark Office*